Figure 9:
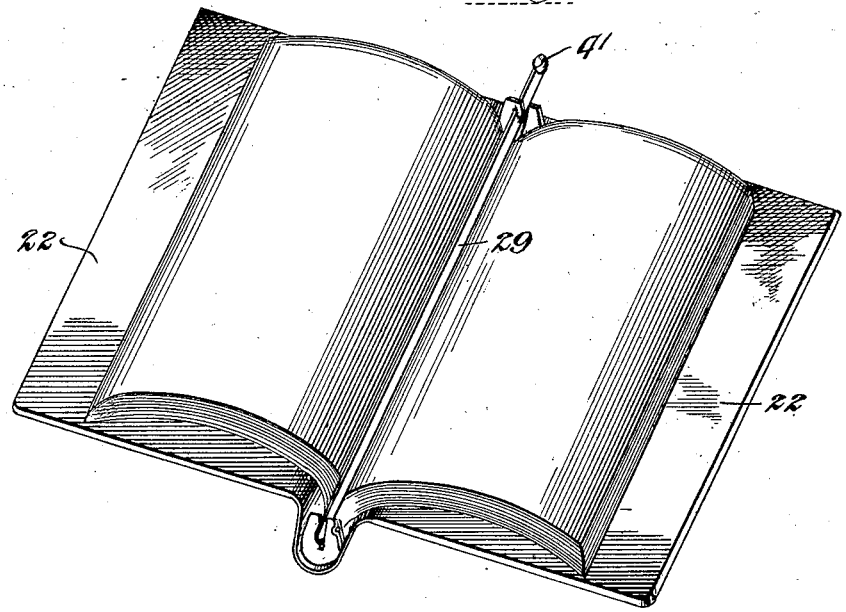

No. 828,297. PATENTED AUG. 14, 1906.
J. R. & A. M. BARRETT.
BINDER.
APPLICATION FILED NOV. 3, 1903.
3 SHEETS—SHEET 1.
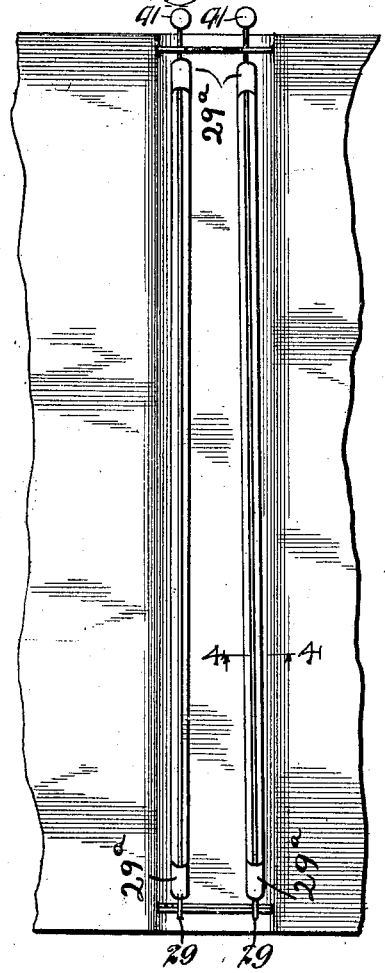
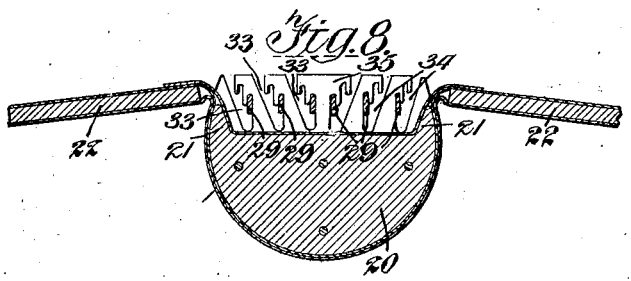
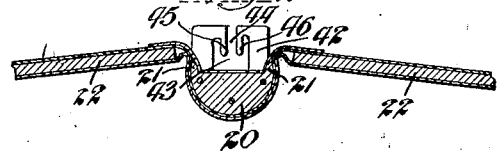
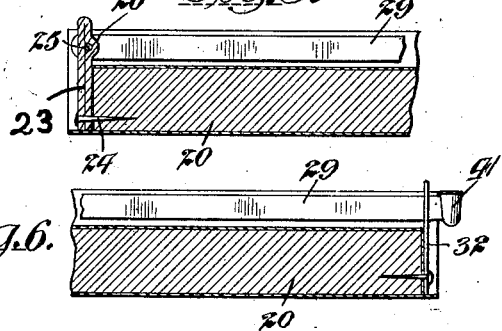
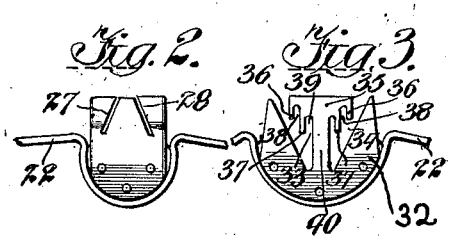
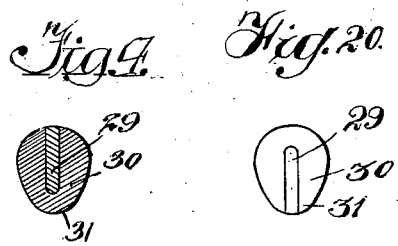
Witnesses:
J. V. Domarus
O. T. Plumtree
Inventors
John R. Barrett
Arthur M. Barrett
by Bond, Adams, Pickard & Jackson
their Attys.
THE NORRIS PETERS CO., WASHINGTON, D. C.

No. 828,297. PATENTED AUG. 14, 1906.
J. R. & A. M. BARRETT.
BINDER.
APPLICATION FILED NOV. 3, 1903.

3 SHEETS—SHEET 2.

Witnesses:-
G. V. Domarus
C. F. Plumtree

Inventors
John R. Barrett
Arthur M. Barrett
by Bond Adams Pickard Jackson
their Attys.

No. 828,297. PATENTED AUG. 14, 1906.
J. R. & A. M. BARRETT.
BINDER.
APPLICATION FILED NOV. 3, 1903.
3 SHEETS—SHEET 3.
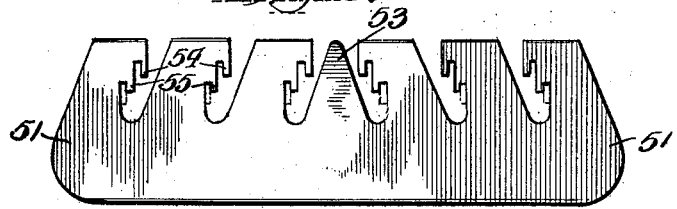
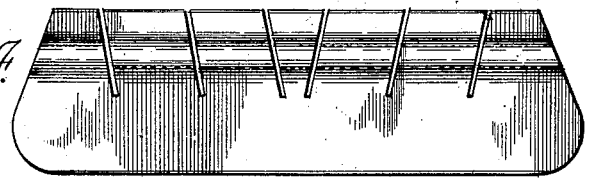
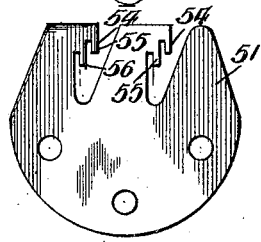
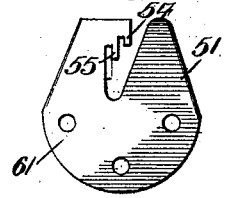
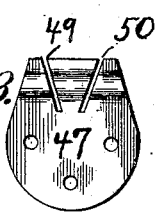
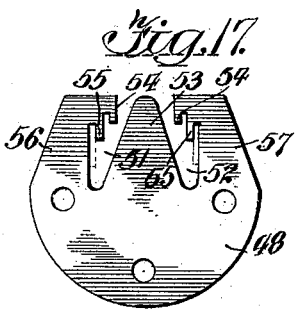
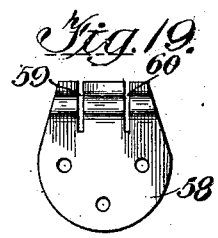
Witnesses:-
Inventors
John R. Barrett,
Arthur M. Barrett,
by Bond, Adams, Pickard & Jackson
their Attys
THE NORRIS PETERS CO., WASHINGTON, D. C.

UNITED STATES PATENT OFFICE.

JOHN R. BARRETT AND ARTHUR M. BARRETT, OF CHICAGO, ILLINOIS; SAID ARTHUR M. BARRETT ASSIGNOR TO SAID JOHN R. BARRETT.

BINDER.

No. 828,297.　　　Specification of Letters Patent.　　　Patented Aug. 14, 1906.

Application filed November 3, 1903. Serial No. 179,757.

*To all whom it may concern:*

Be it known that we, JOHN R. BARRETT and ARTHUR M. BARRETT, citizens of the United States, and residents of Chicago, in the county of Cook and State of Illinois, have invented certain new and useful Improvements in Binders, of which the following is a specification, reference being had to the accompanying drawings.

Our invention relates to temporary binders, such as are commonly employed for binding newspapers, magazines, &c., and has for its object to provide a new and improved binder which will render it unnecessary to perforate the magazines, the construction of which will be such as to permit of the magazines being readily inserted or removed. We accomplish this object as hereinafter described and as illustrated in the drawings.

What we regard as new is set forth in the claims.

Generally speaking, our improved binder consists of a suitable support, on which are mounted one or more binding members or strips which extend longitudinally of the support and serve as a means of securing the magazines thereto. The support is semicircular in cross-section, having generally the form of a half-cylinder, the flat surface being on the inside. Suitable covers are provided at opposite sides of said support, so that the binder presents the appearance of a book. The binding-strips, which are best pivotally connected at one end directly or indirectly with the support, extend longitudinally thereof over its flat inner surface and are secured at their free ends thereto by means of retaining devices, also connected with the support. The retaining devices are provided with one or more deflected passages for admitting the strip into engagement therewith, so that in order to move the retaining strip or strips into operative engagement therewith said strips must be deflected or twisted, and the arrangement is such that the release of the binding-strips from torsion or bending strain operates to lock them in engagement with the retaining means. To this end the binding-strips are made of material that may be deflected or twisted, such as thin strips of metal; but in order to prevent such metal strips from cutting through the fold of the magazines to be bound they are provided with a protecting-covering, preferably in the form of a split sleeve, which fits upon the strips and is secured thereto. Where considerable torsional action is desired, the pivoted ends of the strips are arranged to be secured in planes inclined to the vertical, and the retaining devices for the opposite ends of the strips are provided with slots inclined oppositely with regard to a vertical plane, so that the strips must be twisted to a considerable extent before they can be secured to such retaining devices, thus increasing the torsion strain to which the strips are subjected in locking them in operative position, consequently increasing the security of the lock.

Other more specific features of our improved binder will be particularly hereinafter pointed out.

Figure 10:
Figure 11:
Figure 12:
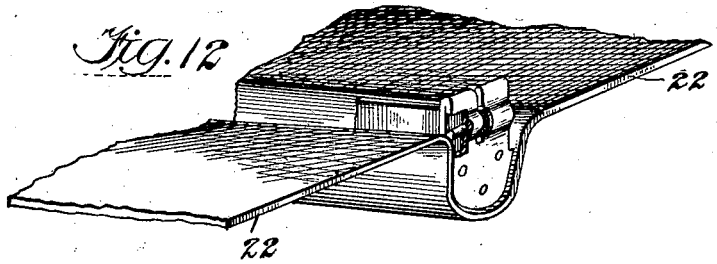

In the accompanying drawings, Figure 1 is a partial plan view illustrating the most approved embodiment of our improved binder. Fig. 2 is what may be termed a "lower end view," being a view of the end at which the binder strip or strips are pivoted. Fig. 3 is a view of the upper end thereof. Fig. 4 is an enlarged detail, being a cross-section of one of the binder-strips on line 4 4 of Fig. 1. Fig. 5 is a partial longitudinal sectional view illustrating the lower end of the binder. Fig. 6 is a similar view showing the upper end of the binder. Fig. 7 is a cross-section showing a modified form of retaining device. Fig. 8 is a cross-section showing a binder provided with a large number of binding-strips. Fig. 9 is a perspective view of a binder having a single binding-strip, showing a magazine in place, the projecting cover of the binding-strip being omitted. Fig. 10 is a cross-section of the binder shown in Fig. 9, illustrating the retaining device thereof. Fig. 11 is a lower end view of the same. Fig. 12 is a perspective view of the same. Figs. 13 and 14 are views of modified forms of the retaining device and pivot-plate. Figs. 15, 16, and 17 are views of a variety of retaining devices. Figs. 18 and 19 are views of modified forms of pivot-plates, and Fig. 20 shows a modified form of strip.

Referring to the drawings, 20 indicates the semicylindrical support, which, as best shown in Fig. 8, is provided with upwardly-extending side edges 21, forming a longitudinal channel in the upper flat surface of the support. The edges or flanges 21 serve to hold the inner edges of the covers 22 up properly, as therein illustrated, and also to keep the back of the magazine or other periodical in place.

23 indicates one of the pivot-plates, which, as best shown in Fig. 5, is secured to one end of the support 20, preferably by nails or screws 24. The pivot-plate 23 is provided with a pivot-pin 25, which extends transversely thereof, lying in a groove formed by impressing a bead 26 in the plate 23. After forming the bead and putting the pivot-pin 25 in position the plate is doubled upon itself with the pivot-pin on the inside, as shown in Fig. 5, so that the two portions of the plate act to clamp the pivot-pin securely in position.

In the form of pivot-plate shown in Fig. 2 two slots 27 28 are provided, which are oppositely inclined with reference to a vertical plane, the upper portions of said slots being closer together. Said slots are adapted to receive what will be termed for convenience the "lower" ends of binding-strips 29, which are mounted upon the pivot-pin 25. The lower ends of said binding-strips are thereby held in oppositely-inclined positions, as best shown in Fig. 2.

30 indicates the protecting sleeve or cover for the strips 29. As best shown in Figs. 4 and 20, said covering 30 is provided with a vertical slot which receives the binding-strip 29, the parts being secured together and the protecting-sleeve strengthened by a ferrule 29ª at either end or in any other suitable way. As the lower surface of the sleeve 30 is rounded, as shown at 31 in Fig. 4, it is not apt to cut through the fold of the magazines or other papers in the binder. The protecting-sleeve also gives the binding-strip greater stiffness laterally, and thus greater security is obtained against accidental release of the magazines than would be the case were the binding-strips used without such sleeve.

32 indicates one form of retaining device by means of which the upper ends of the binding-strips are connected with the support and secured in operative position. The form of retaining device shown in Fig. 3 consists of a plate adapted to be secured against the upper end of the support 20 by nails, screws, or other suitable means, said plate having deflected or inclined passages 33 34 extending down from its upper surface adapted to receive the ends of the binding-strips. As shown in Fig. 3, the passages 33 34 are at opposite sides of an intermediate portion 35 of the plate 32, which intermediate portion is provided with depending fingers 36 37, which extend into each of the passages 33 34, forming, respectively, sockets 38 39 of sufficient width to receive the binding-strips. The appearance presented by the intermediate portion 35 is much like that of a double T, the stem 40 of the T forming a vertical partition between the two passages 33 34.

It will be observed that the lower portions of the passages 33 34 lie closer together, and that consequently said passages 33 34 are oppositely inclined with reference to slots 27 28, respectively. By this construction in order to move the binding-strips into their respective passages 33 34 they must be twisted to a considerable extent—approximately through an arc of about ninety degrees—which twisting is accomplished by simply pressing down the free end of the strip upon the inclined surface which forms the outer margin of the passage 33 or 34, as the case may be, the strip being caused to twist as it passes down into the passage by its engagement with one of the fingers 36. When the upper edge of the strip passes the lower end of the finger 36, if the strip be released it will spring into the socket 38, in which it will be held by its elasticity. If the magazines be thin, the binder-strip may be pressed farther down, passing the finger 37 and entering the socket 38, the operation being the same as before.

For convenience in manipulating them the binding-strips are provided at their free ends with heads 41, as best shown in Figs. 1 and 6.

In Fig. 8 we have shown a binder having a retaining device similar to that shown in Fig. 3, except that six binding-strips are provided for instead of two.

In Fig. 7 a modified form of retaining device is shown intended for use in connection with a pivot-plate having the construction shown in Fig. 2. In said modified form the retaining device consists of a plate 42, having an intermediate opening 43 and a vertical passage 44, extending to said opening, depending fingers 45 46 being provided, as shown in Fig. 3. In this form of retaining device the passage 44 is not made inclined with reference to the support 20; but it is nevertheless inclined or deflected relatively to the normal plane of movement of the binding-strip, the inclination of the binding-strip alone being relied upon to give the necessary torsion effect. Obviously when the binding-strip is pressed down through the passage 44 it is twisted so as to lie in a vertical plane; but when released it flies up into one of the retaining-sockets.

Figs. 18 and 17 show, respectively, a pivot-plate 47 and retaining device 48, in which the parts are oppositely arranged as compared with those shown in Figs. 2 and 3. In the pivot-plate 47 slots 49 50 are closer together at the bottom than at the top, and in the retaining device the inclined passages 51 52 are nearer together at the top than at the bottom. Also instead of providing a T-shaped portion between said passages, as in the construction shown in Fig. 3, we make the intermediate portion 53 wedge-shaped, with its apex uppermost, and provide depending fingers 54 55 in upwardly-extending side portions 56 57 of the retaining device. The operation is, in effect, the same as that already described in connection with Figs. 2 and 3. 58 indicates a further style of pivot-plate, in which the slots 59 60 are vertically disposed. This form is used where great torsion strain is not desired. In connection with the pivot-plate 58 we may employ retaining devices similar to those shown in Figs. 15 and 16. The retaining device 61 shown in Fig. 16 is similar to that shown in Fig. 17, differing in that one of the upwardly-projecting side portions 56 or 57 is removed. Where this form of retaining device is used, only one slot is provided in the pivot-plate. The form shown in Fig. 15 is the same as that shown in Fig. 16, except that two binding-strips are provided for.

Figs. 13 and 14 illustrate a retaining device and a pivot-plate having the construction shown in Figs. 17 and 18, but arranged to accommodate six binding-strips instead of two. Obviously the number of binding-strips may be varied at pleasure, depending on the capacity of the binder.

In addition to the modifications shown our invention includes various other arrangements, and we wish it to be understood that it is not restricted to the specific forms shown and described, except in so far as they are particularly claimed, but includes, generically, the invention set forth in the broader claims.

What we claim as our invention, and desire to secure by Letters Patent, is—

1. A binder, comprising a suitable support, a binding-strip, laterally-projecting means for engaging one end of said binding-strip and detachably connecting it with the support and means for deflecting said strip into position to engage said laterally-projecting means.

2. A binder, comprising a suitable support, a binding-strip pivotally connected at one end with said support, laterally-projecting means for engaging the other end of said binding-strip and detachably connecting it with the support and means for deflecting said strip into position to engage said laterally-projecting means.

3. A binder, comprising a suitable support, a twistable binding member, and laterally-projecting retaining means for detachably connecting an end portion of said binding member with said support.

4. A binder, comprising a suitable support, a twistable binding member pivotally connected at one end with said support, and laterally-projecting retaining means for detachably engaging the other end portion of said binding member.

5. A binder, comprising a suitable support, a twistable binding member, and retaining means having a passage deflected relatively to the normal plane of movement of said binding member for admitting said binding member into engagement therewith.

6. A binder, comprising a suitable support, a twistable binding member pivotally connected at one end with said support, and laterally-projecting retaining means having a passage deflected relatively to the normal plane of movement of said binding member for admitting said binding member into engagement therewith.

7. A binder, comprising a suitable support, a twistable binding member, and retaining means for detachably connecting an end portion of said binding member with said support, said retaining means being arranged to receive said binding member when the latter is twisted out of its normal position, substantially as described.

8. A binder, comprising a suitable support, a twistable binding member pivotally connected at one end with said support, and retaining means for detachably connecting an end portion of said binding member with said support, said retaining means being arranged to receive said binding member when the latter is twisted out of its normal position, substantially as described.

9. A binder, comprising a suitable support, a twistable binding member consisting of a flat strip, and retaining means for detachably connecting an end portion of said binding member with said support, said retaining means being arranged to receive said binding member when the latter is twisted out of its normal position, substantially as described.

10. A binder, comprising a suitable support, a twistable binding member consisting of a flat strip pivotally connected at one end with said support, and retaining means for detachably connecting an end portion of said binding member with said support, said retaining means being arranged to receive said binding member when the latter is twisted out of its normal position, substantially as described.

11. A binder, comprising a suitable support a twistable binding member, and retaining means for detachably connecting an end portion of said binding member with said support, said retaining means being arranged to receive said binding member when the latter is twisted out of its normal position and having means for locking said binding member in operative position when the torsion strain on the latter is relaxed, substantially as described.

12. A binder, comprising a suitable support, a twistable binding member pivotally connected at one end with said support, and retaining means for detachably connecting an end portion of said binding member with said support, said retaining means being arranged to receive said binding member when the latter is twisted out of its normal position and having means for locking said binding member in operative position when torsion strain on the latter is relaxed, substantially as described.

13. A binder, comprising a suitable support, a twistable binding member consisting of a flat strip pivotally connected at one end with said support, and retaining means for detachably connecting an end portion of said binding member with said support, said retaining means being arranged to receive said binding member when the latter is twisted out of its normal position and having means for locking said binding member in operative position when torsion strain on the latter is relaxed, substantially as described.

14. A binder, comprising a suitable support, a binding-strip, and slots at opposite ends of said support for connecting the ends of said binding-strip with said support, said slots being inclined relatively to each other, substantially as described.

15. A binder, comprising a suitable support, a binding-strip pivotally mounted at one end in a slot carried by said support, and a slot inclined relatively to said first-mentioned slot for detachably connecting the other end of said binding-strip with said support, substantially as described.

16. A binder, comprising a suitable support, a plurality of twistable binding members mounted on said support, and retaining means for detachably securing end portions of said binding members to said support, said retaining means being arranged to receive said binding members when the latter are twisted out of their normal positions, substantially as described.

17. A binder, comprising a suitable support, twistable binding members carried thereby adapted to be twisted in opposite directions, and retaining means for detachably connecting end portions of said binding members with said support, said retaining means being arranged to receive said binding members when the latter are twisted out of their normal positions, substantially as described.

18. A binder, comprising a suitable support, twistable binding members carried thereby adapted to be twisted in opposite directions, and retaining means for detachably connecting end portions of said binding members with said support, said retaining means being arranged to receive said binding members when the latter are twisted out of their normal positions and having means for locking said binding members in operative position when the torsion strain on the latter is relaxed, substantially as described.

19. A binder, comprising a suitable support, a twistable binding member, retaining means for detachably connecting an end portion of said binding member with said support, and means for twisting said binding member as it is moved into engagement with said retaining means, substantially as described.

20. A binder, comprising a suitable support, a twistable binding member pivotally connected with said support, and a retaining device having a passage adapted to receive one end of said binding member, said passage lying in a plane inclined with reference to the plane in which said binding member normally lies, substantially as described.

21. A binder, comprising a suitable support, a twistable binding member, a slotted pivot-plate carried by said support and pivotally supporting said binding member, and a retaining device carried by said support, said retaining device having an inclined passage adapted to receive said binding member, said inclined passage lying in a plane inclined to the plane of the slot in said pivot-plate, substantially as described.

22. A binder, comprising a suitable support, a plurality of twistable binding members pivotally connected with said support, a pivot-plate to which said binding members are pivotally connected, and retaining means carried by said support, said retaining means having passages inclined in opposite directions and each inclined relatively to the plane of movement of its binding member adapted to receive the ends of said binding members, substantially as described.

23. A binder, comprising a suitable support, a plurality of twistable binding members, a pivot-plate carried by said support, said pivot-plate having slots inclined in opposite directions, one end of each of said binding members being secured in said slots, and retaining means for detachably connecting the free ends of said binding members with said support, said retaining means being arranged to twist said binding members as they are moved into engagement therewith substantially as described.

24. A binder, comprising a suitable support, a twistable binding-strip pivotally mounted at one end on said support, a protecting-sleeve carried by said binding-strip, and means for detachably connecting the other end of said binding-strip with said support.

JOHN R. BARRETT.
ARTHUR M. BARRETT.

Witnesses:
JOHN L. JACKSON,
A. H. ADAMS.